United States Patent
Beers et al.

(10) Patent No.: US 11,103,963 B2
(45) Date of Patent: Aug. 31, 2021

(54) METHOD OF REPAIR TO COMPRESSOR HOUSING AND REPAIRED HOUSING

(71) Applicant: Hamilton Sundstrand Corporation, Charlotte, NC (US)

(72) Inventors: Craig M. Beers, Wethersfield, CT (US); Lino S. Italia, Rocky Hill, CT (US); John M. Beck, Bloomfield, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 144 days.

(21) Appl. No.: 16/284,178

(22) Filed: Feb. 25, 2019

(65) Prior Publication Data

US 2020/0269364 A1    Aug. 27, 2020

(51) Int. Cl.
| | |
|---|---|
| *B23P 6/00* | (2006.01) |
| *B23K 15/00* | (2006.01) |
| *B64F 5/40* | (2017.01) |

(52) U.S. Cl.
CPC ............ *B23P 6/00* (2013.01); *B23K 15/0053* (2013.01); *B23P 6/002* (2013.01); *B64F 5/40* (2017.01)

(58) Field of Classification Search
CPC .. B23P 6/00; B23P 6/002; B23P 6/005; B23K 15/0053; B64F 5/40; F04D 29/056; F04D 29/023; F04D 29/4206; F05D 2230/80
See application file for complete search history.

(56) References Cited

U.S. PATENT DOCUMENTS

| | | |
|---|---|---|
| 9,243,643 B2 | 1/2016 | Beers et al. |
| 10,132,327 B2 | 11/2018 | Beers et al. |
| 10,155,290 B2 | 12/2018 | Beers et al. |
| 2010/0064514 A1* | 3/2010 | Kersteman .............. B23P 6/005 29/888.021 |

(Continued)

FOREIGN PATENT DOCUMENTS

DE    102014214226 A1    1/2016

OTHER PUBLICATIONS

European Search Report for EP Application No. 19215823.6 dated Jun. 29, 2020.

(Continued)

*Primary Examiner* — Jun S Yoo
(74) *Attorney, Agent, or Firm* — Carlson, Gaskey & Olds, P.C.

(57) ABSTRACT

A method of repairing a compressor outlet housing includes the steps of obtaining a damaged compressor outlet housing having a radially outer volute, a radially inwardly extending finger extending to an axially extending ledge, a radially inwardly extending web extending radially inwardly from the ledge, and a radially inner bearing support defining a bore. The method identifies a damaged section within at least one of the bearing support, the web, and the ledge, and removes at least the bearing support and the web to leave a remaining part. The method then inserts an insert having at least a replacement bearing support and a replacement web into the remaining part after the removal step. The method then welds the insert to the remaining part to provide a repaired compressor housing. A method of replacing a compressor outlet housing and a replacement compressor outlet housing are also disclosed.

9 Claims, 10 Drawing Sheets

(56) References Cited

U.S. PATENT DOCUMENTS

2012/0099980 A1     4/2012  Nishita et al.
2017/0204867 A1*    7/2017  Beers ..................... F16C 35/02
2017/0204873 A1*    7/2017  Beers ................. F04D 29/4206

OTHER PUBLICATIONS

European Search Report for EP Application No. 20210002.0 dated Feb. 11, 2021.

* cited by examiner

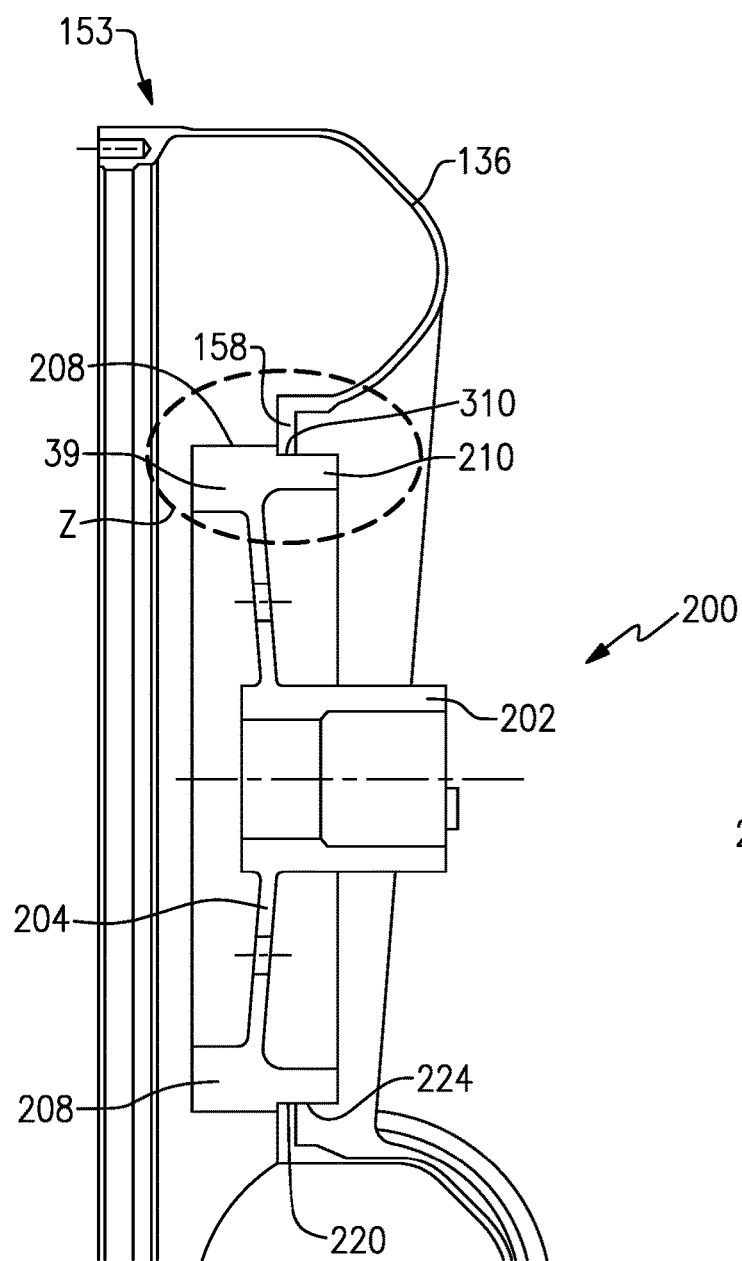
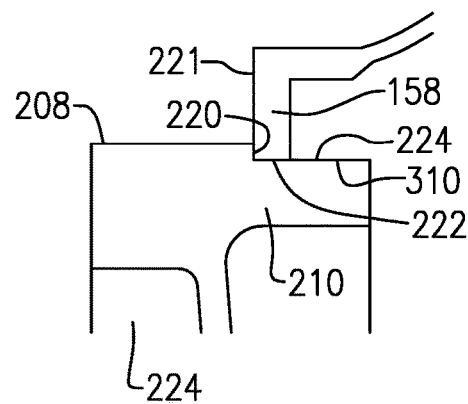
FIG.6A
FIG.6B

METHOD OF REPAIR TO COMPRESSOR HOUSING AND REPAIRED HOUSING

BACKGROUND

This application relates to a method of repairing a compressor housing and a repaired compressor housing.

Compressors are utilized in any number of applications. One compressor is provided to supply compressed air to an air cycle machine on an aircraft. In known compressors, a compressor outlet housing has a volute, which provides a changing flow cross-sectional area downstream of a compressor impeller. The outlet housing further has a bearing support, which mounts a bearing on the housing to support a shaft driving the impeller. An outer ledge provides a support surface for a portion of the impeller. The bearing support is connected to the outer ledge through a radially outwardly extending web.

The web is provided as a solid portion and the overall compressor housing is cast and then machined to a complex shape.

As can be appreciated, the outlet housing sees a number of challenges in operation and can be damaged. While it has been proposed to replace a bearing support with a bearing support insert, damage can occur elsewhere.

SUMMARY

A method of repairing a compressor outlet housing includes the steps of obtaining a damaged compressor outlet housing having a radially outer volute, a radially inwardly extending finger extending to an axially extending ledge, a radially inwardly extending web extending radially inwardly from the ledge, and a radially inner bearing support defining a bore. The method identifies a damaged section within at least one of the bearing support, the web, and the ledge, and removes at least the bearing support and the web to leave a remaining part. The method then inserts an insert having at least a replacement bearing support and a replacement web into the remaining part after the removal step. The method then welds the insert to the remaining part to provide a repaired compressor housing.

A method of replacing a compressor outlet housing and a replacement compressor outlet housing are also disclosed.

These and other features may be best understood from the following drawings and specification.

BRIEF DESCRIPTION OF THE DRAWINGS

FIG. 6A shows a method step.
FIG. 6B is an enlarged detail of a section Z from FIG. 6A.

DETAILED DESCRIPTION

Figure 1:
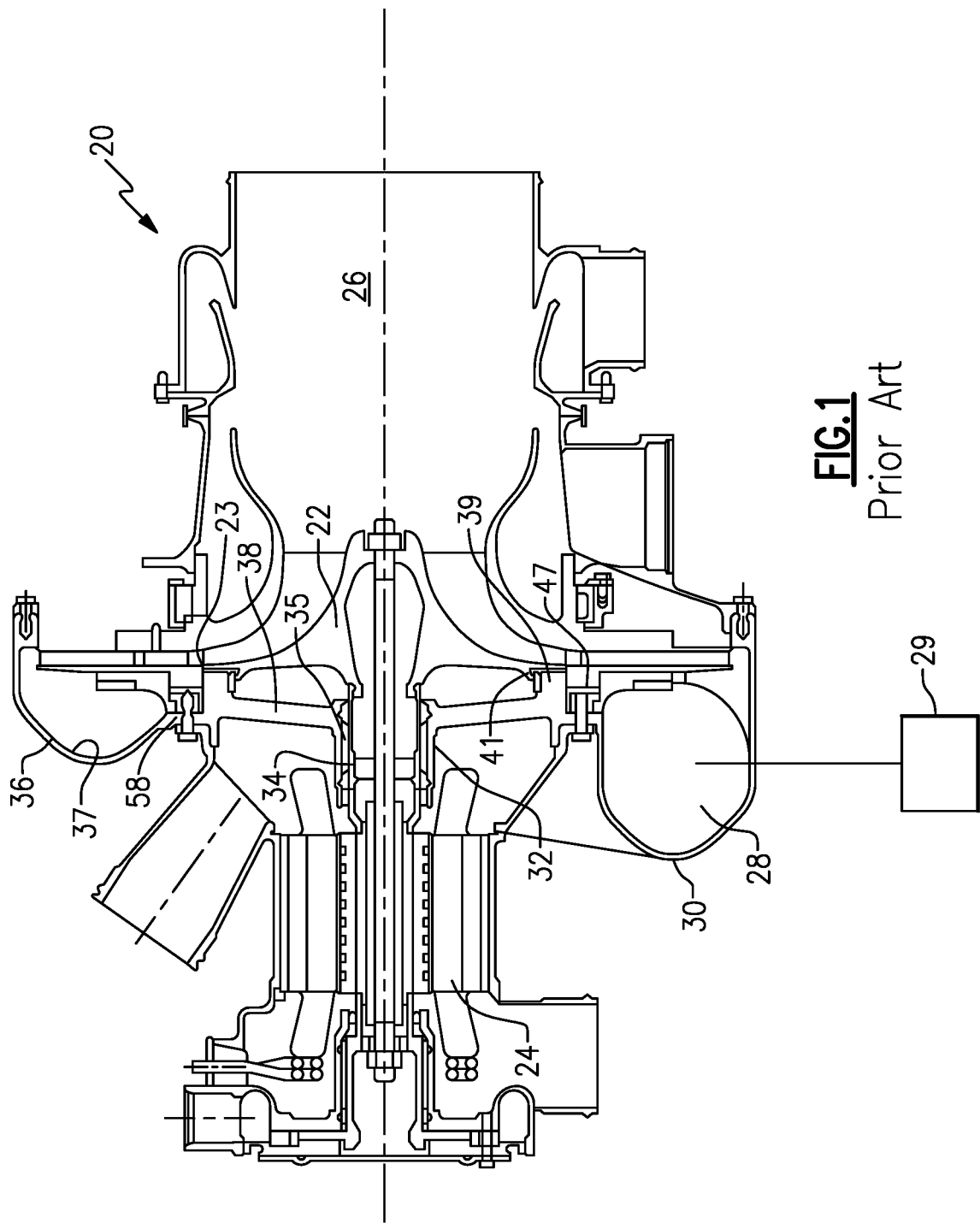
FIG. 1 shows a known compressor.

A compressor 20 includes an impeller 22 driven by a motor 24 through a shaft 34. An inlet 26 supplies air to the impeller 22 and the air is compressed and delivered to an outlet 28. An outlet housing 30 includes a volute 36 having an innerface 37 defining a flow passage, which changes a cross-sectional area between an outlet 23 of the impeller 22 and the outlet 28 of the housing. Outlet 28 is connected to an air cycle machine 29 such as may be utilized in an aircraft application.

As can be seen, the outlet housing 30 includes a bearing support 32, which supports an outer surface of the shaft 34 through bearings 35. A web 38 connects the bearing support 32 to a ledge 39. The ledge 39 connects the web 38 to the volute 36 through finger 58. As shown, seal teeth 41 on the back of compressor impeller 22 are positioned adjacent a softer material on the compressor outlet housing 30. The seal teeth can dig a groove into this portion of the housing to minimize air leakage.

Figure 2A:
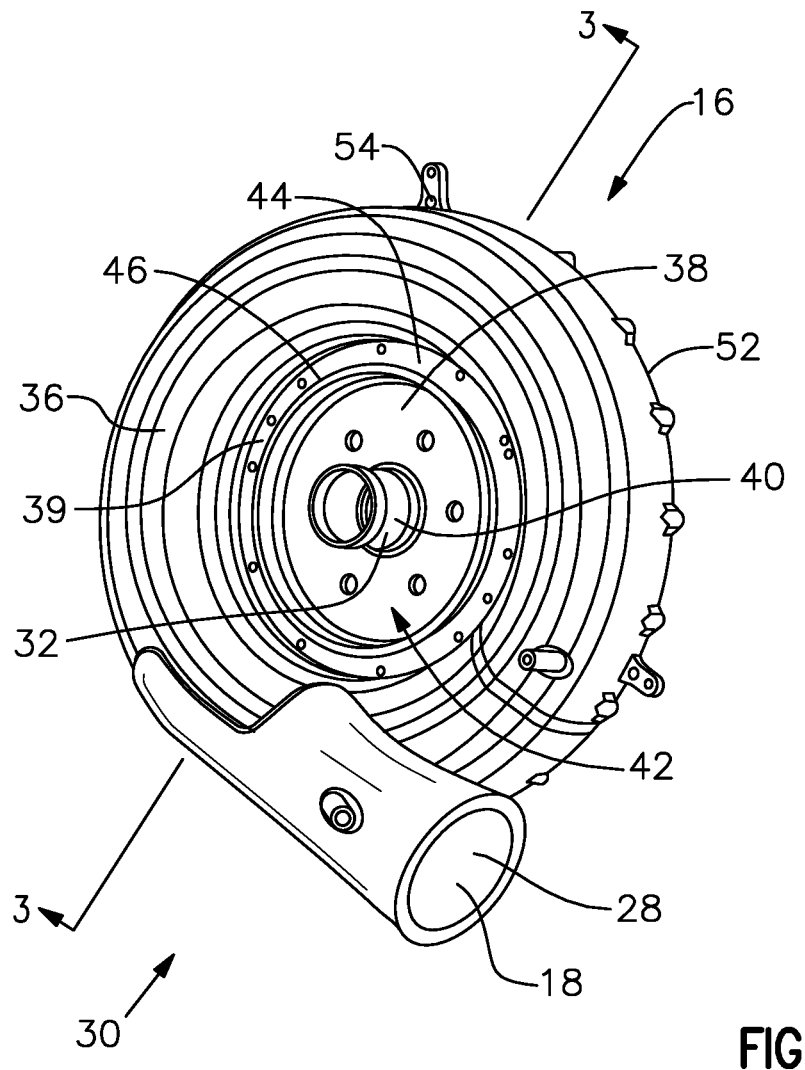
FIG. 2A shows a compressor outlet housing.

FIG. 2A shows the compressor outlet housing 30. The bearing support 32 is connected by the web 38 to the ledge 39. The volute 36 is connected to the ledge 39 through finger 58.

Figure 2B:
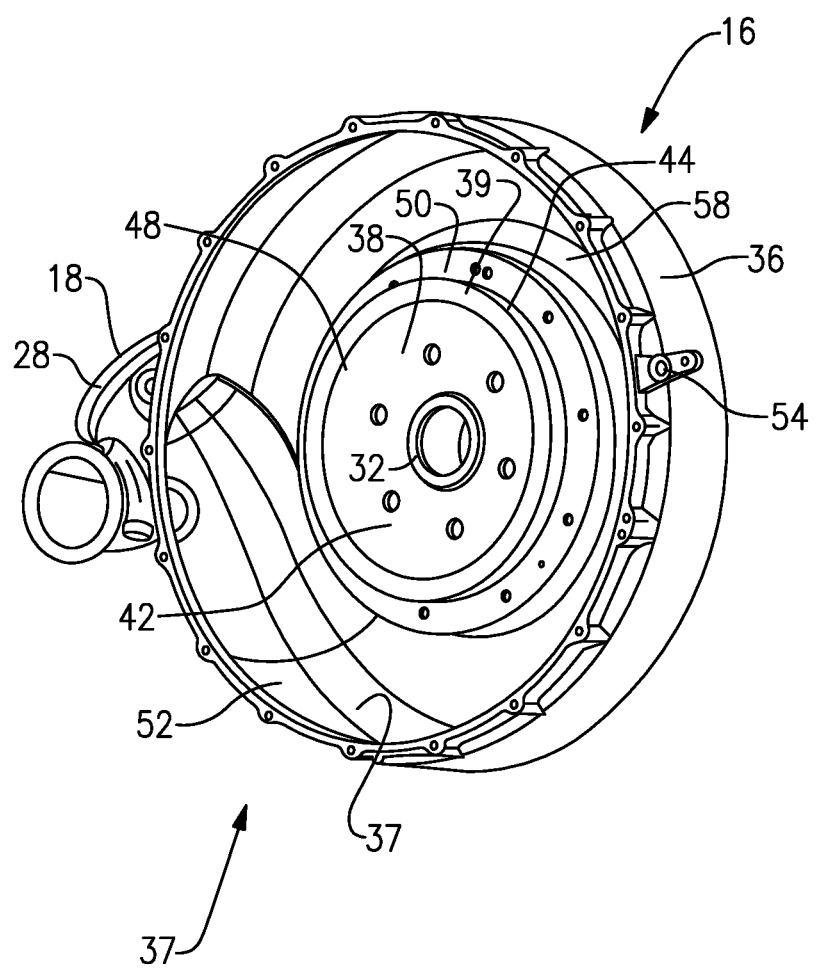
FIG. 2B is an opposed view of the FIG. 2A compressor outlet housing.

FIG. 2B is an opposed view of the compressor outlet housing 30 and shows the inner surface 37. Further, one can see the finger 58 ledge 39, web 38, and bearing support 32.

Figure 3:
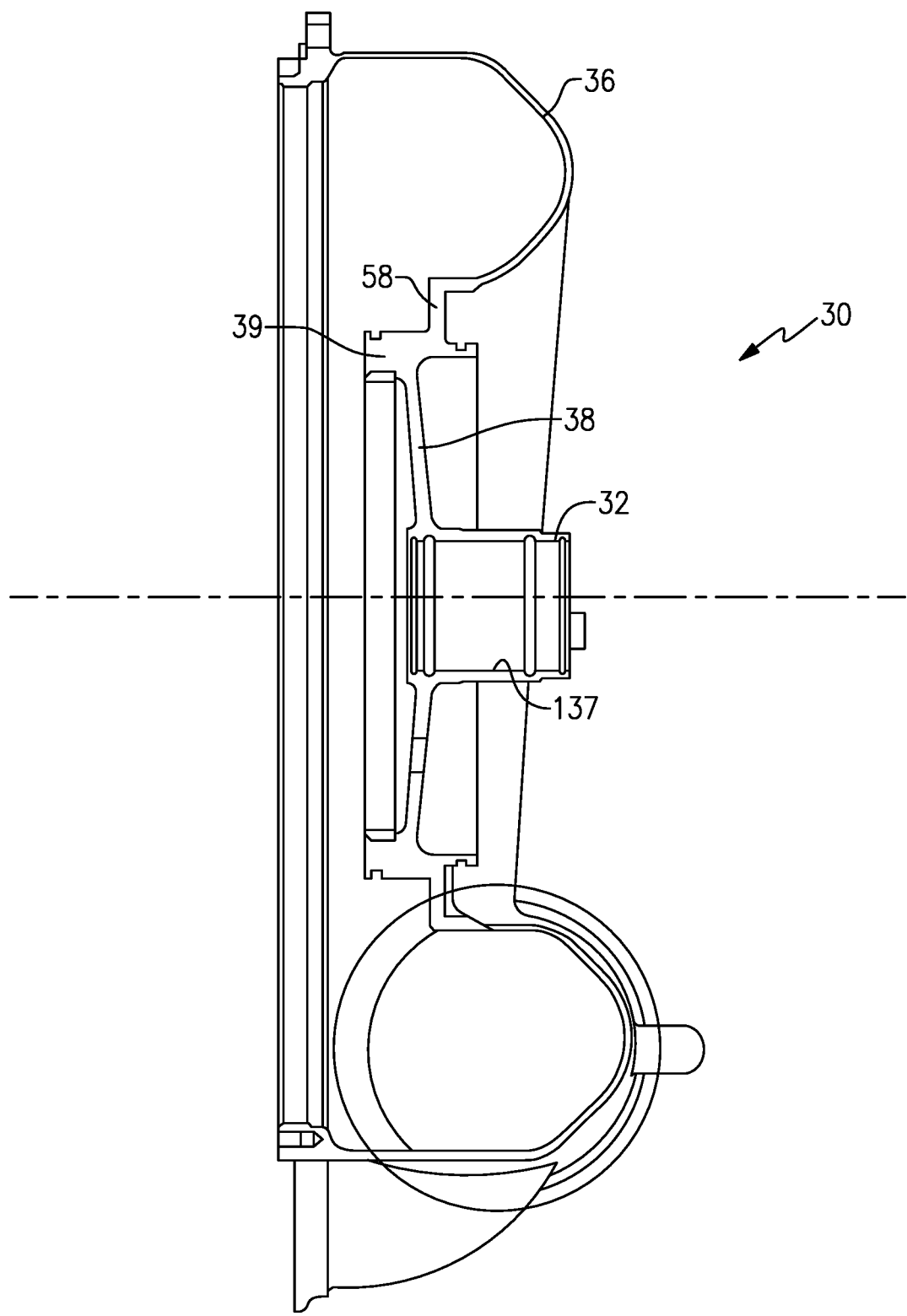
FIG. 3 is a cross-sectional view through the compressor outlet housing.

FIG. 3 shows a cross-section through the prior art compressor housing 30. As can be seen, bearing support 32 defining a bore 137 to receive a bearing is connected to the axially extending ledge 39 through the radially inwardly extending web 38. A radially inwardly extending finger 58 actually connects the volute 36 to the ledge 39.

Figure 4A:
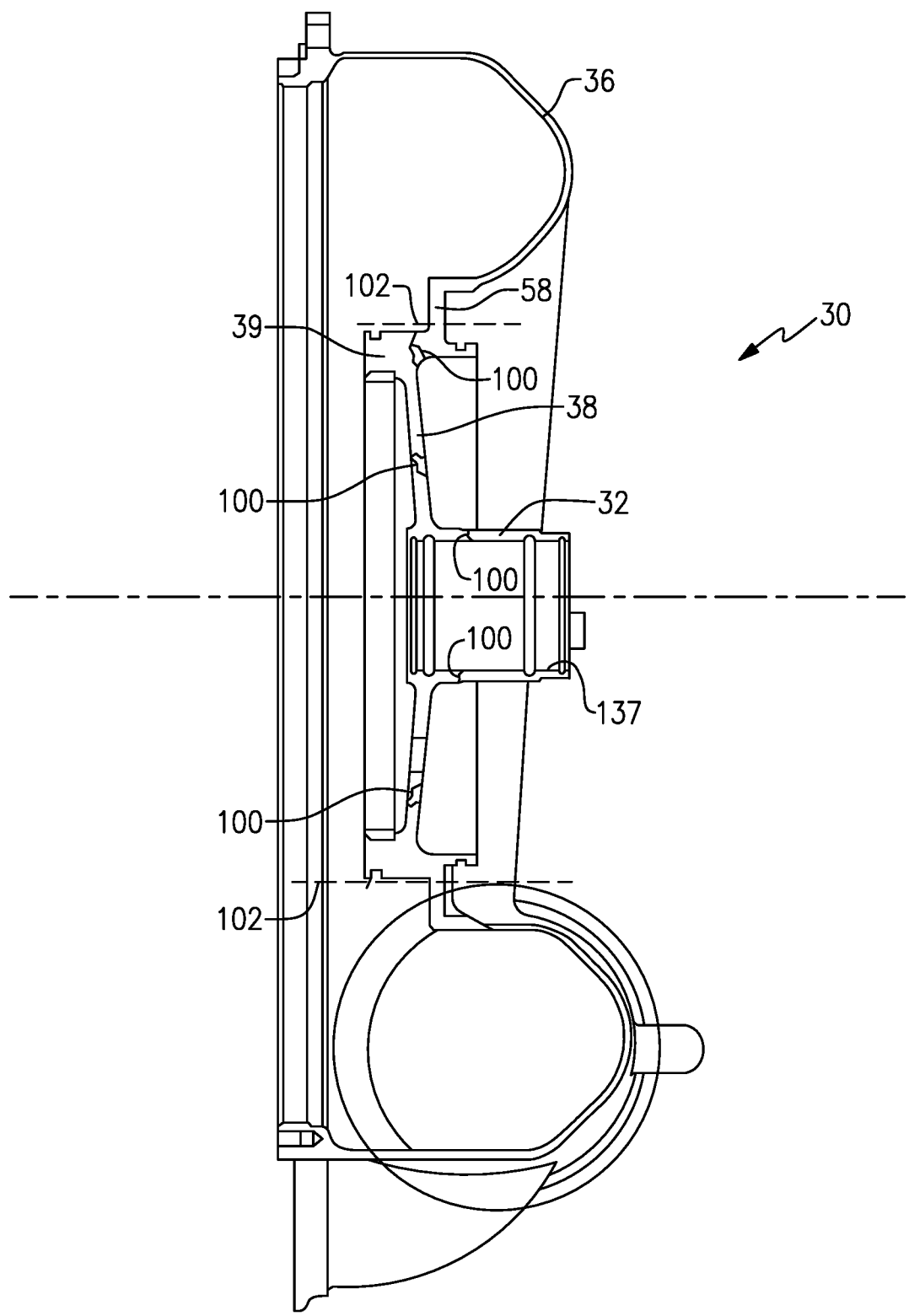
FIG. 4A shows damage to the compressor outlet housing.

FIG. 4A shows a challenge with the existing compressor outlet housing 30. Cracks 100 are shown in the bearing support 32, the web 38 and in the ledge 39. The compressor outlet housing 30 is an expensive part and is complex to manufacture.

Thus, a way to repair the damaged compressor outlet housing, as shown in FIG. 4A, would be beneficial. As shown in FIG. 4A, a cut 102 is made to remove the damaged area. The cut 102 separates the ledge 39 from the radially inwardly extending finger 58.

Figure 4B:
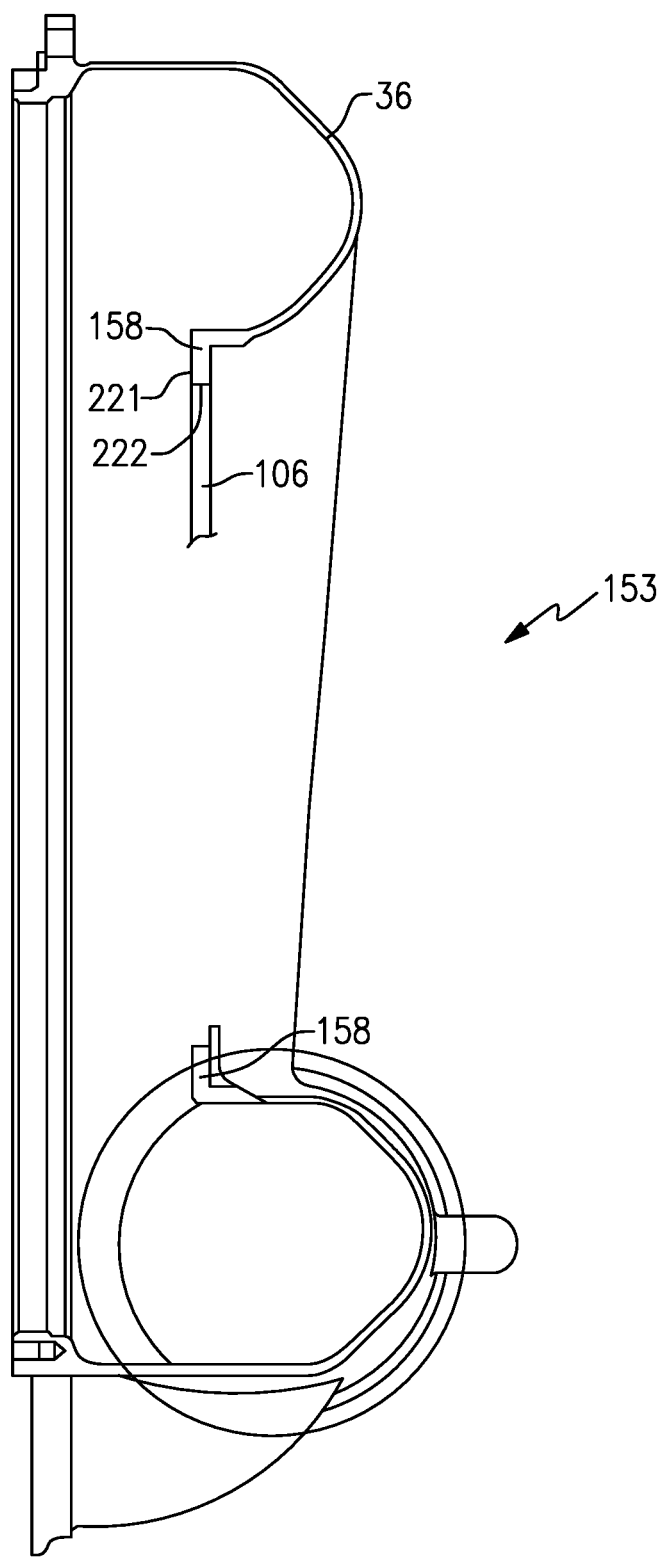
FIG. 4B shows a first step in repairing the compressor outlet housing.

An intermediate part 153 is shown in FIG. 4B having the finger 58 defining a radially inner surface 222 after the cut at 102 (see FIG. 4A). Radially inner surface provides a radial datum point at 222 for subsequent repair steps. As shown schematically in FIG. 4B, the radially inner surface 222 and an axially rear surface 221 of the remaining finger 58 are machined as at 106 to reach a desired datum. As can be appreciated, the location of the several structures in the compressor outlet housing must be precisely aligned for the overall compressor 20 to operate.

The cut 202 can be made at the point the finger 58 joins the ledge 39 or can remove a small portion of the finger. With either option, the remaining finger portion is still called a finger for purposes of this application.

Figure 5:
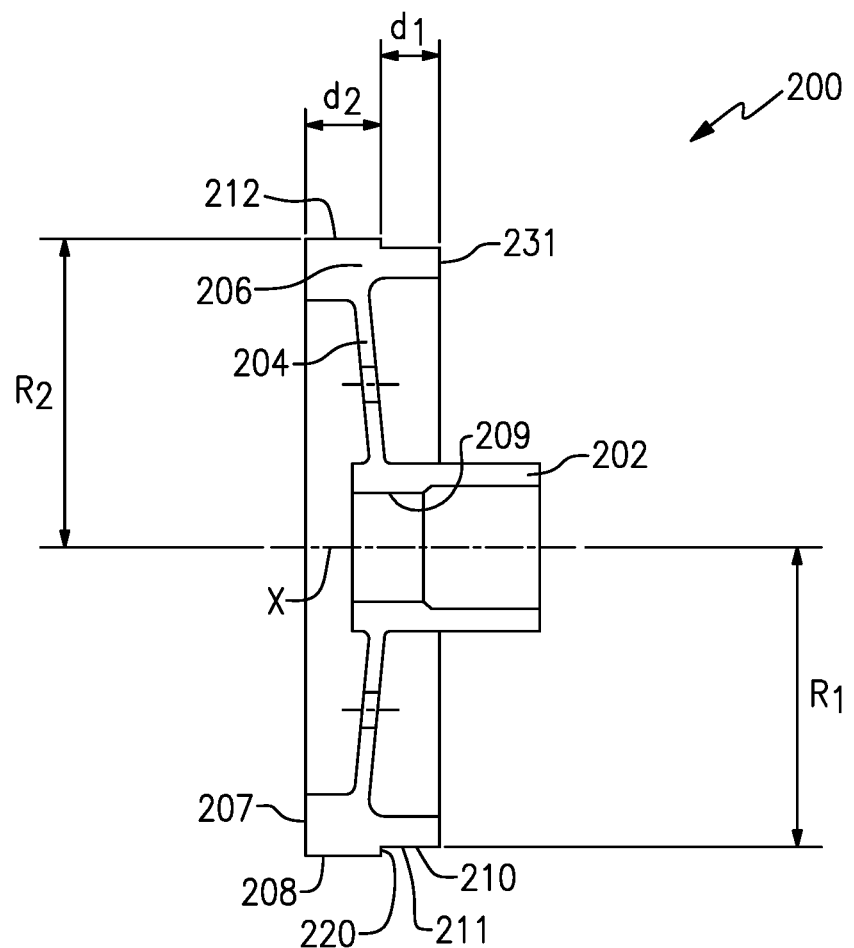
FIG. 5 shows an insert to replace a removed portion of a compressor outlet housing.

An insert 200 is illustrated in FIG. 5. Insert 200 has a replacement bearing support 202, which roughly matches the bearing support 32 in size, material, etc. A replacement web 204 (also matching the web 38) extends from the bearing support 202 to a replacement ledge 206. Replacement ledge 206 has an axially rear enlarged portion 208 and a forward extending portion 210. A first radius $R_1$ is defined from a central axis X of a bore 209 in the bearing support 202 to an outer surface 211 of the forward extending portion 210. A second radius $R_2$ is defined from axis X to the outer surface 212 of the rear portion 208. An axial distance $d_1$ is defined from a rear point 220 of the forward portion 210 to a forward end 231 of the forward portion. A second distance $d_2$ is defined between the forward end 220 of the rear portion 208 and a rear surface 207.

As can be appreciated, surface 220 is both the forward end of rear portion 208, and the rear end of forward portion 210.

In one embodiment, $R_1$ was 4.78 in. (12.14 cm) and $R_2$ was 4.90 in. (12.45 cm). In embodiments, a ratio of $R_1$ to $R_2$ is between 0.963 and 0.988.

In one embodiment, $d_1$ was 0.930 in (2.36 cm) and $d_2$ was 1.20 in. (3.05 cm). In embodiments, a ratio of $d_1$ to $d_2$ is between 0.731 and 0.821.

As shown in FIG. 6A, insert 200 is now inserted within the remaining finger 158 of the intermediate part 153. A weld joint 310 is formed to connect the two. Electron beam welding is preferably utilized. The forward end 220 of the rear portion 208 of insert 200 abuts a rear surface 221 of the finger 158. An outer surface 224 of the forward portion 210 supports the inner surface 222 of finger 158. As can be appreciated, the location of the axially forward surface 220 of the rear portion 208 and the outer surface 224 of the forward portion 210 are carefully formed to a desired size and mate with finger 158 to properly position the remaining 153 in both radial and axial directions.

As shown in FIG. 6B, the forward surface 220 of the rear portion 208 and a forward surface 221 of the finger 158 provide axial location. The inner surface 222 of the finger 158 and the outer surface 224 of the forward portion 210 radially position the two portions together. The weld joint 310 is shown. By having the enlarged portion 208, backup material is provided which will prevent gas entrapment at a backside of the weld. At least some percentage of the rear portion 208 is sacrificed to provide the weld joint 310. As such, the repaired part will likely not have a surface extending to the original $R_2$.

Figure 7A:
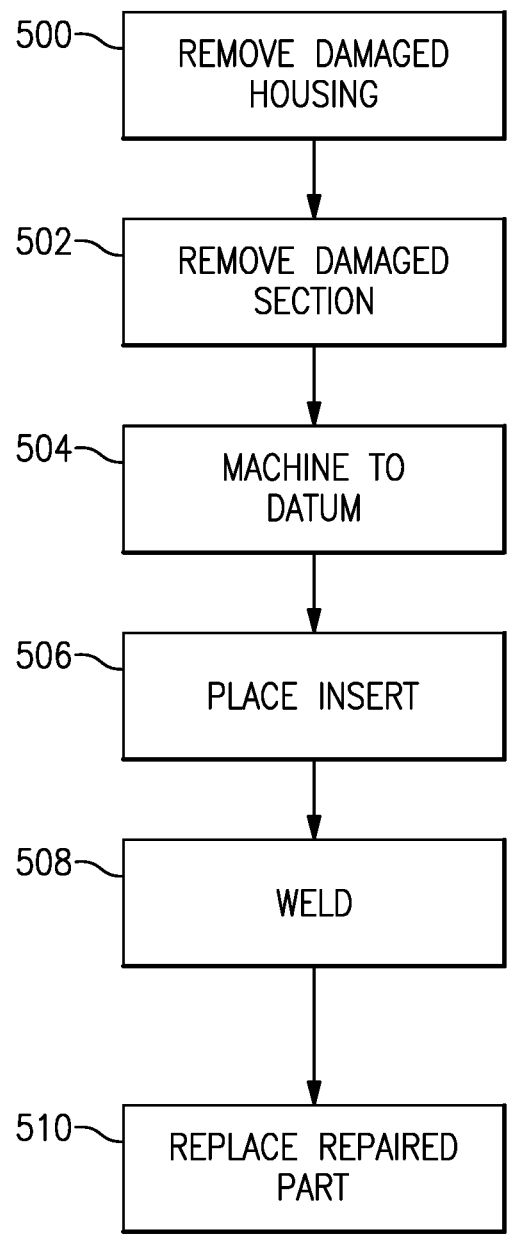
FIG. 7A is a flowchart.

As shown in FIG. 7A, a flowchart of the method according to this disclosure could be said to include a step 500 of removing the damaged housing from the compressor. Next, a damaged section is removed from the damaged housing at step 502. Next, the remaining portion of the damaged housing is machined to a datum at step 504. In step 506, an insert is placed within the remaining portion. At step 508, the insert is welded to the remaining portion. At step 510, the repaired compressor housing is replaced in a compressor.

Figure 7B:
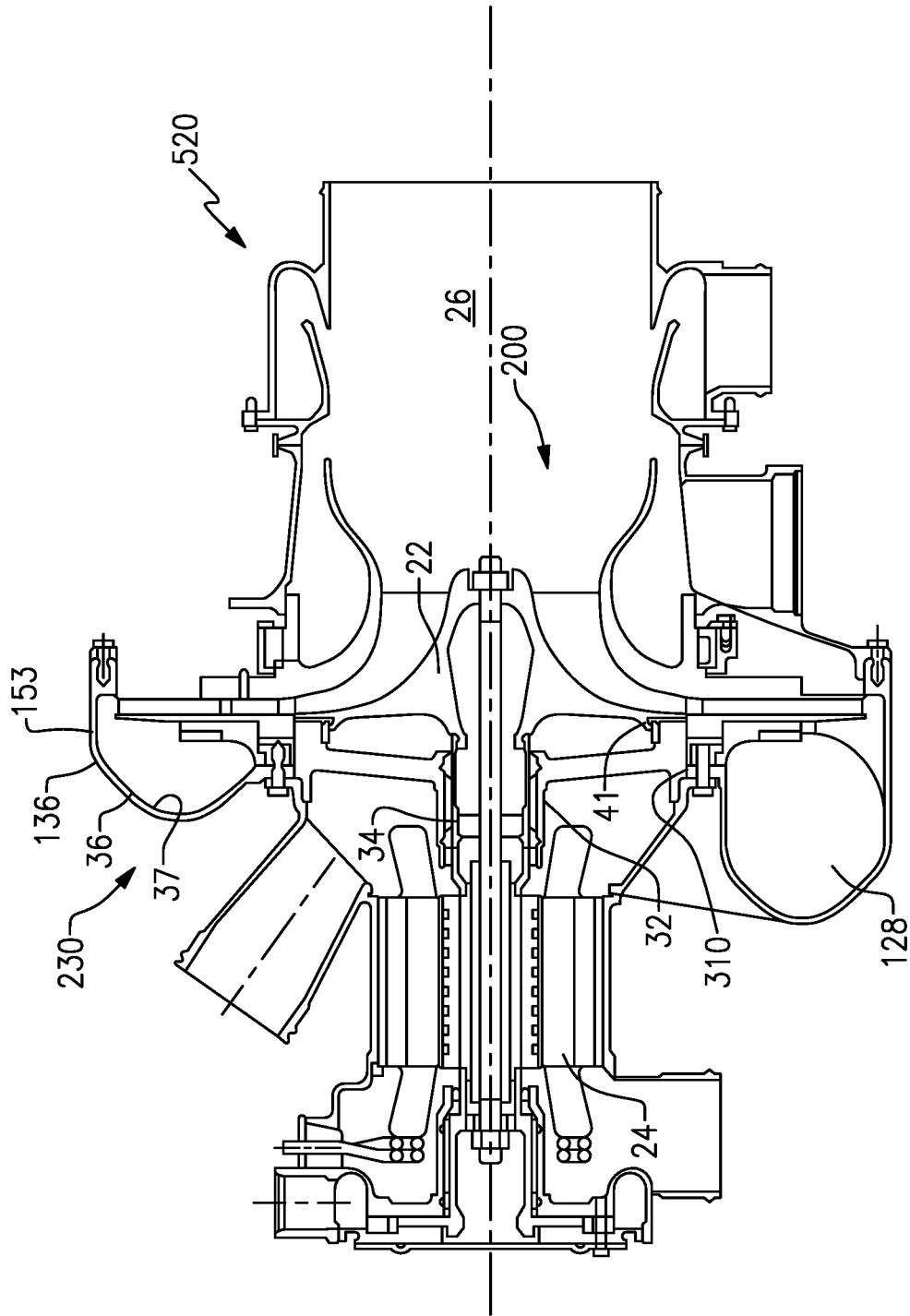
FIG. 7B shows a repaired compressor.

FIG. 7B shows a repaired compressor 520 now having a compressor outlet housing 230, which includes the insert 200 and the remaining part 153.

A method of repairing a compressor outlet housing under this disclosure could be said to include the steps of: (a) obtaining a damaged compressor outlet housing having a radially outer volute, a radially inwardly extending finger extending to an axially extending ledge, a radially inwardly extending web extending radially inwardly from the ledge, a radially inner bearing support defining a bore; (b) identifying a damaged section within at least one of the bearing support, the web, and the ledge; and (c) removing at least the bearing support and the web leaving a remaining part; (d) inserting an insert having at least a replacement bearing support and a replacement web into the remaining part after step (c); and (e) welding the insert to the remaining part to provide a repaired compressor housing.

A method of replacing a compressor outlet housing under this disclosure could be said to include the steps of (a) removing a first compressor outlet housing from a compressor having a compressor impeller driven by a motor through a drive shaft, the first compressor outlet housing having a first bearing support portion supporting a bearing for the drive shaft, the first bearing support portion connected through a first radially outwardly extending web to a first ledge, and a first volute connected to the first ledge through a first radially inwardly extending finger; and (b) replacing the second compressor outlet housing with a second compressor outlet housing, the second compressor outlet housing having a second volute and a second radially inwardly extending finger extending from a radially inner end of the second volute, and the second radially inwardly extending finger being welded to an insert, the insert having a second bearing support placed on the drive shaft to support the bearing for said drive shaft, and the insert having a second web connecting a second ledge to the bearing support, and the radially inwardly extending finger welded to the second ledge.

While the removed compressor outlet housing could be removed and repaired, it is also within the scope of the method that the replacement compressor outlet housing could have been prepared before the removal of the removed compressor outlet housing, and from a different repaired housing.

A replacement compressor outlet housing under this disclosure could be said to include a compressor outlet housing, having a volute and a radially inwardly extending finger extending from a radially inner end of said volute. The radially inwardly extending finger is welded to an insert. The insert has a bearing support defining a bore, and the insert having a web connecting a replacement ledge to the bearing support, and the radially inwardly extending finger welded to the ledge.

Although an embodiment of this invention has been disclosed, a worker of ordinary skill in this art would recognize that certain modifications would come within the scope of this disclosure. For that reason, the following claims should be studied to determine the true scope and content of this disclosure.

The invention claimed is:

1. A method of repairing a compressor outlet housing comprising the steps of:
   (a) obtaining a damaged compressor outlet housing having a radially outer volute, a radially inwardly extending finger extending to an axially extending ledge, a radially inwardly extending web extending radially inwardly from said ledge, a radially inner bearing support defining a bore;
   (b) identifying a damaged section within at least one of said bearing support, said web, and said ledge;
   (c) removing at least said bearing support and said web leaving a remaining part;
   (d) inserting an insert having at least a replacement bearing support and a replacement web into the remaining part after step (c);
   (e) welding said insert to said remaining part to provide a repaired compressor housing; and
   wherein the removal of step (c) includes removing said ledge such that said remaining part has said finger to provide a radial datum surface.

2. The method as set forth in claim 1, wherein said finger is machined to ensure a desired datum point for a radially inner surface of said finger.

3. The method as set forth in claim 2, wherein said insert has a replacement ledge welded to said finger.

4. The method as set forth in claim 3, wherein said replacement ledge portion has an axially extending portion providing a radial support location for said radially inner surface of said finger, and said replacement ledge having an axially rear portion extending radially outwardly for a greater amount to a radially outer surface than does a radially outer surface of said axially extending portion, there being an axially forward end of said axially rear portion, and said finger abutting the axially forward end to provide axial alignment.

5. The method as set forth in claim 4, wherein a portion of said axially rear portion which extends radially outwardly to a greater extent than does said axially extending portion of said replacement ledge section is sacrificed during said welding.

6. The method as set forth in claim 1, wherein said insert has a replacement ledge welded to said finger.

7. The method as set forth in claim 6, wherein said replacement ledge portion has an axially extending portion providing a radial support location for said radially inner surface of said finger, and said replacement ledge having an axially rear portion extending radially outwardly for a greater amount to a radially outer surface than does a radially outer surface of said axially extending portion, and said finger abutting an axially forward end of said axially rear portion to provide axial alignment.

8. The method as set forth in claim 7, wherein a first radius is defined to said radially outer surface of said axially extending portion and a second radius is defined to a said radially outer surface of said axially rear portion, and a ratio of said first radius to said second radius is between 0.963 and 0.988, and a first distance is defined between said axially forward end of said axially rear portion to an axially forward end of said axially extending portion, and a second distance is defined between an axially rear end of said axially rear portion to said axially forward end of said axially rear portion, and a ratio of said first distance to said second distance is between 0.731 and 0.821.

9. The method as set forth in claim 1, wherein said welding is electron beam welding.

* * * * *